United States Patent
Katti et al.

(10) Patent No.: US 11,316,667 B1
(45) Date of Patent: Apr. 26, 2022

(54) KEY EXCHANGE USING PRE-GENERATED KEY PAIRS

(71) Applicant: Juniper Networks, Inc., Sunnyvale, CA (US)

(72) Inventors: Pavan Gururaj Katti, Sunnyvale, CA (US); Veerabhushan K. Hatte, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 247 days.

(21) Appl. No.: 16/452,188

(22) Filed: Jun. 25, 2019

(51) Int. Cl.
  *H04L 9/08* (2006.01)
  *H04L 29/06* (2006.01)

(52) U.S. Cl.
  CPC .......... *H04L 9/0825* (2013.01); *H04L 9/0866* (2013.01); *H04L 9/0891* (2013.01); *H04L 9/0894* (2013.01); *H04L 63/0442* (2013.01)

(58) Field of Classification Search
  CPC ... H04L 9/0825; H04L 9/0866; H04L 9/0891; H04L 9/0894; H04L 63/0442
  See application file for complete search history.

(56) References Cited

U.S. PATENT DOCUMENTS

| | | | | |
|---|---|---|---|---|
| 9,894,067 | B1* | 2/2018 | Mandadi | H04L 63/0807 |
| 2003/0026427 | A1* | 2/2003 | Couillard | H04L 9/0822 |
| | | | | 380/277 |
| 2003/0126466 | A1* | 7/2003 | Park | H04L 63/164 |
| | | | | 726/4 |
| 2004/0107366 | A1* | 6/2004 | Balfanz | H04L 29/06 |
| | | | | 726/5 |
| 2008/0075280 | A1* | 3/2008 | Ye | H04K 1/00 |
| | | | | 380/44 |
| 2009/0092252 | A1* | 4/2009 | Noll | H04L 9/0891 |
| | | | | 380/277 |
| 2012/0300940 | A1* | 11/2012 | Sabin | H04L 63/06 |
| | | | | 380/282 |
| 2014/0013123 | A1* | 1/2014 | Khazan | H04L 63/061 |
| | | | | 713/189 |
| 2016/0261566 | A1* | 9/2016 | Parviainen-Jalanko | |
| | | | | H04W 12/04 |

(Continued)

FOREIGN PATENT DOCUMENTS

WO    2006/102565 A2    9/2006

OTHER PUBLICATIONS

Oracle Key Manager 3. Administration Guide [online], Oracle Corporation. 2019 [retrieved on Dec. 3, 2021]. Retrieved from the Internet <URL: https://docs.oracle.com/cd/E50985_03/OKMAG/E41579-09.pdf>. p. 9-1 to p. 9-15. (Year: 2019).*

(Continued)

*Primary Examiner* — Jeremy S Duffield
*Assistant Examiner* — Zhe Liu
(74) *Attorney, Agent, or Firm* — Harrity & Harrity, LLP

(57) ABSTRACT

A network device may identify a plurality of security policies associated with the network device. The network device may generate respective sets of local key pairs for the plurality of security policies, wherein the respective sets of local key pairs are to facilitate negotiating security associations involving the network device. The network device may store the respective sets of local key pairs in a key data structure of the network device to permit the network device to provide, to a source device, a local public key for a security association with the source device.

20 Claims, 7 Drawing Sheets

(56) References Cited

U.S. PATENT DOCUMENTS

| | | | |
|---|---|---|---|
| 2017/0070497 A1* | 3/2017 | McCallum | H04L 9/3236 |
| 2017/0237558 A1* | 8/2017 | Yuan | H04L 9/12 |
| | | | 380/279 |
| 2017/0244566 A1* | 8/2017 | Tschache | H04L 9/3242 |
| 2019/0158537 A1* | 5/2019 | Miriyala | G06F 21/606 |
| 2019/0245704 A1* | 8/2019 | Pala | H04L 9/3242 |

OTHER PUBLICATIONS

Harkins et al., "The Internet Key Exchange (IKE)", Nov. 1998, 41 pages.

Kaufman et al. "Internet Key Exchange Protocol Version 2 (IKEv2)", Oct. 2014, 142 pages.

\* cited by examiner

KEY EXCHANGE USING PRE-GENERATED KEY PAIRS

BACKGROUND

Internet Key Exchange (IKE) is a key management protocol that is used to authenticate internet protocol security (IPsec) peers, negotiate and distribute IPsec encryption keys, and automatically establish IPsec security associations (SAs). Examples of IPsec peers may include client devices, network devices, and/or the like.

SUMMARY

According to some implementations, a method may include receiving, from a source device, a request associated with a key exchange, wherein the key exchange is associated with a security association involving a network, and wherein the request includes a source public key for the security association; determining a characteristic of the source public key; selecting, from a key data structure, a local public key to provide to the source device, wherein the local public key is selected, based on the characteristic of the source public key, from a plurality of local key pairs stored in the key data structure, and wherein the local public key is associated with a local key pair of the plurality of local key pairs; providing the local public key to the source device to negotiate the security association; determining, based on the characteristic and a local private key of the local key pair, a local secret key associated with the source public key; and performing an action associated with negotiating the security association using the local secret key.

According to some implementations, a network device may include one or more memories; and one or more processors communicatively coupled to the one or more memories, to: receive, from a source device, a request associated with a key exchange, wherein the request includes a source public key; select, from a key data structure and based on a characteristic of the source public key, a local public key to provide to the source device, wherein the key data structure includes a plurality of local key pairs, and wherein the local public key is associated with a key pair of the plurality of key pairs; and provide the local public key to the source device to negotiate a security association between the source device and the network device.

According to some implementations, a non-transitory computer-readable medium may store one or more instructions. The one or more instructions, when executed by one or more processors of a network device, may cause the one or more processors to: identify a plurality of security policies associated with the network device; generate respective sets of local key pairs for the plurality of security policies, wherein the respective sets of local key pairs are to facilitate negotiating security associations involving the network device; and store the respective sets of local key pairs in a key data structure of the network device to permit the network device to provide, to a source device, a local public key for a security association with the source device.

DETAILED DESCRIPTION

Figure 1A:
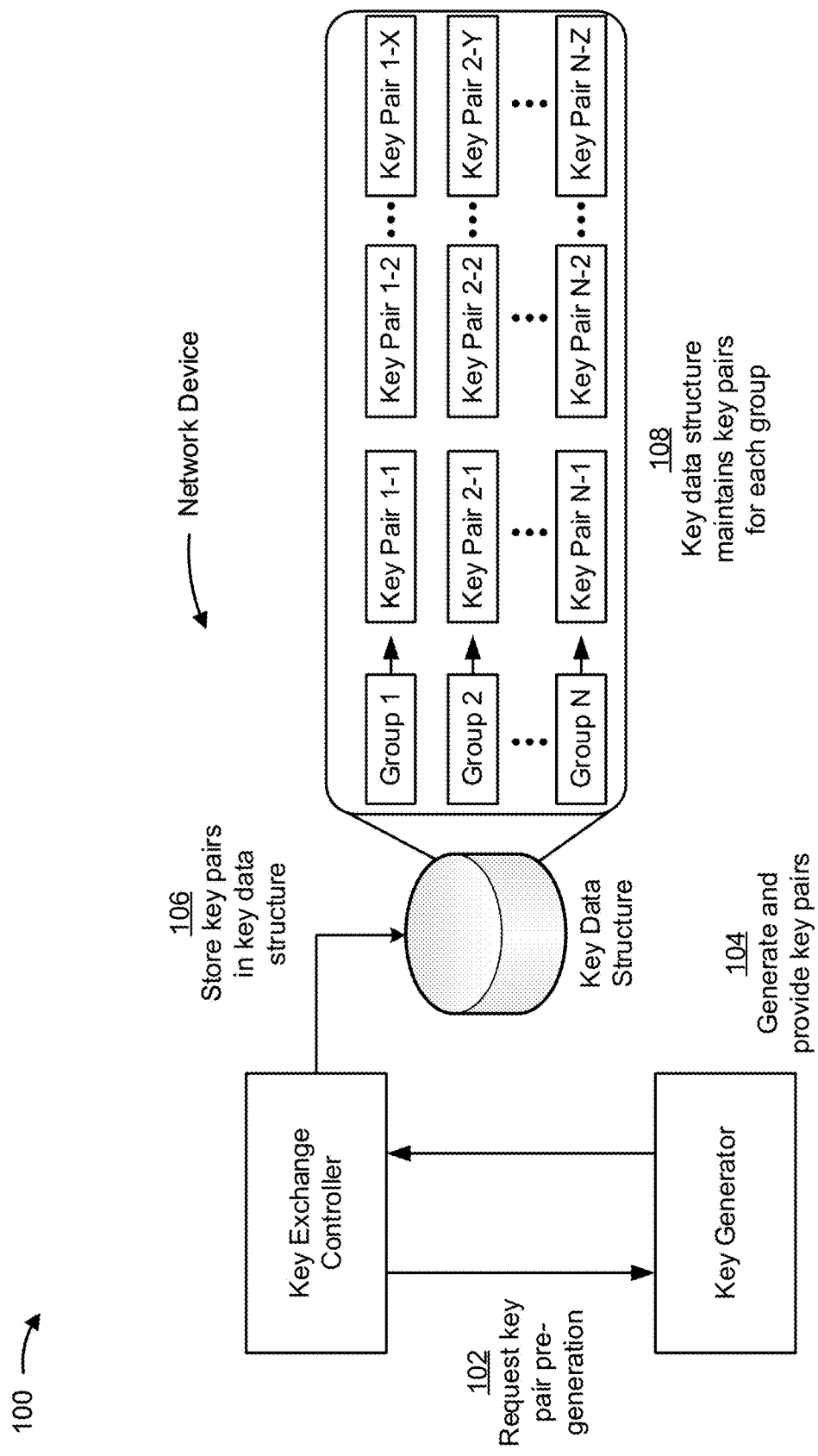
FIGS. 1A and 1B are diagrams of an example implementation described herein.

The following detailed description of example implementations refers to the accompanying drawings. The same reference numbers in different drawings may identify the same or similar elements.

A key exchange (e.g., an internet key exchange (IKE)) may be used to establish an encrypted communication session. The key exchange may include two phases. In a first phase (Phase 1), devices that are to be involved in the encrypted communication session negotiate a security association (e.g., an IKE tunnel) for the encrypted communication session. The security association negotiated from Phase 1 enables the devices to communicate securely in Phase 2. During a second phase (Phase 2) of the key exchange the devices may establish security associations for other applications, such as internet protocol security (IPsec).

In previous techniques, negotiation of a security association involves utilizing Diffie Hellman (DH) operations associated with receiving a source public key from a source device, generating, based on receiving the source public key, a local key pair that includes a local public key and a local private key for the security association, computing a local secret key for the security association, and providing the local public key to the source device to enable encrypted communication session. In such cases, the local key pair is generated according to a bitlength of the source public key, and the local secret key is determined based on the source public key and the local private key. A time period associated with negotiating the security association is based on the amount of time required for a device to perform the DH operations to generate the local key pair and determine the local secret key. Because such DH operations involve modular exponentiation, the greater the bitlength of the keys that are to be used for a security association, the more secure the security association and the more time is required to negotiate the security association. Further, the more time that is required to generate security associations, the fewer security associations that a particular device (e.g., a network device) can perform in a given time period, which may result in dropped network traffic from timeouts associated with attempting to communicate with the device.

According to some implementations described herein, a network device utilizes a plurality of pre-generated key pairs for various DH groups (e.g., groups of devices that may utilize keys with different bitlengths, keys of different types, and/or the like) to negotiate a security association (e.g., to establish an encrypted communication session). For example, the network device may determine security policies for a set of DH groups, pre-generate a plurality of local key pairs (each with a local public key and a local private key), and store the pre-generated local key pairs in a key data structure. The set of DH groups may correspond to types of devices and/or types of keys that are expected to be used to communicate with the network device during encrypted communication sessions. Further, when a key exchange for a security association is to occur, the network device may select one of the pre-generated local key pairs for the key exchange (e.g., based on a determined characteristic of a received source public key), and provide a local public key from the selected key pair to establish the security association. Further, while or after providing the local public key, the network device may determine a local secret key for the security association. The local secret key may correspondingly be generated based on the local private key of the selected local key pair.

In this way, a network device may more quickly, relative to previous techniques, provide a local public key to a source device for a key exchange, which correspondingly reduces the amount of time required to set up a security association because the network device does not have to perform a DH operation to generate the local key pair in response to receiving the source public key (e.g., because the local key pair for the security association was pre-generated). In some implementations, a replacement key pair may be generated to replace a selected local key pair (e.g., after the security association is negotiated and/or at a time when the network device is not utilizing computing resources to perform the key exchange). In this way, a particular quantity of pre-generated local key pairs for negotiating security associations can be maintained in a key data structure of the network device.

Accordingly, the network device, as described herein, may perform one or more processes to reduce an amount of time associated with a key exchange (e.g., an amount of time to negotiate a security association), thereby conserving computing resources (e.g., processor resources, memory resources, and/or the like) and/or network resources that may otherwise be wasted, using previous techniques. For example, such computing resources and/or network resources may include resources involved with generating and/or transmitting network traffic that would by dropped by the network device, and/or resources involved with requesting key exchanges that could not be performed by the network device because the network device was pre-occupied with performing another key exchange to negotiate another security association.

Figure 1B:
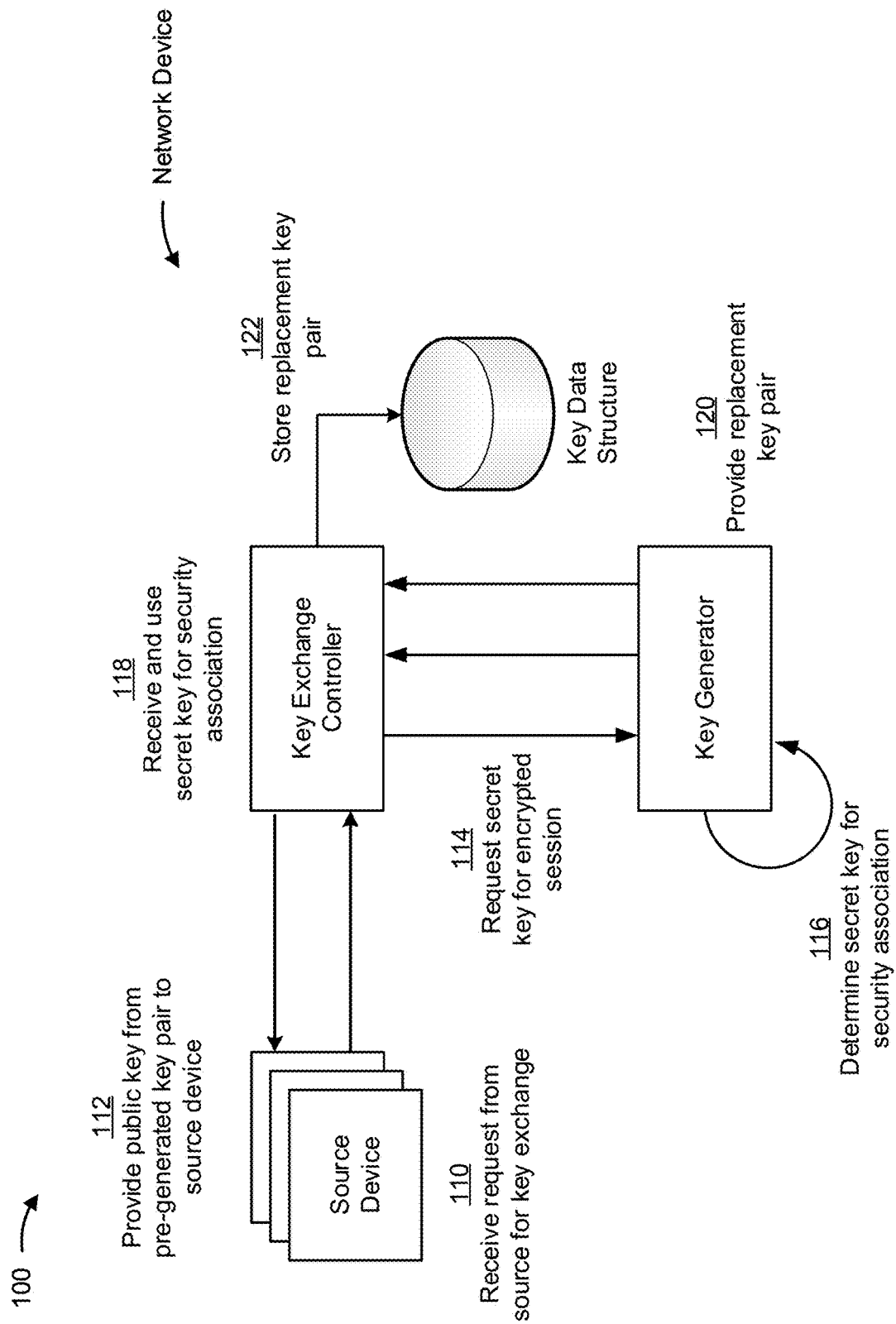

FIGS. 1A and 1B are diagrams of an example implementation 100 described herein. Example implementation 100 includes a key exchange controller, a key generator, a key data structure, and one or more source devices (referred to individually as a "source device" and collectively as "source devices"). The key exchange controller, the key generator, and/or the key data structure may be associated with a network device (e.g., a firewall, a router, a switch, and/or the like). The source devices may include one or more client devices (e.g., user devices, end point devices, peers, and/or the like) and/or one or more network devices communicatively coupled with the network device. As described herein, the key exchange controller and/or key generator may pre-generate a plurality of key pairs for key exchanges with the source devices. The key exchange controller and/or key generator may utilize the pre-generated key pairs during a key exchange to negotiate a security association with the source device, as described herein.

As shown in FIG. 1A, and by reference number 102, the key exchange controller requests key pair pre-generation. For example, the key exchange controller may request the key generator to pre-generate local key pairs for security associations involving the network device. The key exchange controller may request the key generator to generate the local key pairs based on the network device being powered on, based on the network device being communicatively coupled with a network, based on receiving a user input to activate key pair pre-generation for key exchanges, and/or the like. Accordingly, the key exchange controller may request the key generator to generate the local key pairs without receiving a particular request from another device (e.g., the source device) to engage in a key exchange (for a security association).

In some implementations, the key exchange controller may request the key generator to pre-generate a set of local key pairs for a particular DH group. For example, the key exchange controller may determine, from a request involving a key exchange, that a security association is to be negotiated involving keys with a characteristic that does not correspond to any of the characteristics of any of the local key pairs in the key data structure. In other words, the key exchange controller may determine that local key pairs have not been pre-generated for the DH group. Accordingly, based on such a determination, the key exchange controller may request the key generator to pre-generate a set of local key pairs for the DH group. In such cases, the key exchange controller may then be able to reply to future requests utilizing one of the pre-generated local key pairs, as described herein.

In this way, the key exchange controller may request the key generator to pre-generate local key pairs to permit the key generator to pre-generate the local key pairs for key exchanges, as described herein.

As further shown in FIG. 1A, and by reference number 104, the key generator generates and provides the key pairs. For example, based on receiving the request from the key exchange controller, the keg generator may pre-generate a plurality of local key pairs for key exchanges. As described herein a local key pair may include a local public key and a local private key. The key generator may be any suitable type of key generator (e.g., a random key generator, a preconfigured key generator, and/or the like).

According to some implementations, the key generator may generate a plurality of sets of local key pairs for the network device. For example, each set of local key pairs may correspond to a particular security policy corresponding to a type of encryption of a security association. The security policy may correspond to a particular group of devices (e.g., a group of devices that are a same type of device) with which the network device is capable of communicating. Additionally, or alternatively, the security policy may correspond to a particular type of encrypted communication session associated with the network device (e.g., a type of encrypted communication session in which the network device is capable of engaging).

In some implementations, to generate the local key pairs the key generator may identify a plurality of security policies associated with the network device. For example, the plurality of security policies may be stored and/or maintained in a security policy database and/or other type of mapping of the network device. In some implementations, the security policies may be default security policies of the network device. Additionally, or alternatively, the security policies may be configurable security policies (e.g., dynamic security policies that can be generated or updated in real-time). For example, the security policies may be configurable based on user inputs to the network device, based on security policies provided by other devices communicatively coupled to the network device, based on receiving a particular type of key (e.g., a particular type of source public key) from another device (e.g., the source device), and/or the like.

According to some implementations, each set of security policies may correspond to a particular group. For example, as shown in FIG. 1A, the key data structure includes a plurality of local key pairs in one or more groups (Group 1 to Group N, where N corresponds to the number of security policies and/or sets of the local key pairs). Accordingly, a first security policy may be associated with Group 1, a second security policy may be associated with Group 2, and so on. Therefore, when generating a set of local key pairs for a group, the key generator may identify a characteristic for that group and generate the set of local key pairs for that group according to the characteristic. For example, the key generator may identify a bitlength, an encryption type, and/or the like for local key pairs to be utilized in security associations involving a particular group, and generate corresponding local key pairs based on the bitlength, encryption type, and/or the like. In this way, the key generator may pre-generate a plurality of sets of local key pairs with different characteristics to facilitate negotiating a security association that involves keys corresponding to the different characteristics.

In this way, the key exchange controller may cause the key generator to pre-generate a plurality of sets of local key pairs for potential security associations (e.g., for potential encrypted communication sessions) involving the network device, as described herein.

As further shown in FIG. 1A, and by reference number 106, the key exchange controller stores the local key pairs in the key data structure. The key data structure may be any suitable data structure implemented by any suitable volatile memory (e.g., a cache) and/or non-volatile memory (e.g., a flash memory). For example, the key data structure may be a database, a table, an index, a graph, and/or the like. The key exchange controller may store (e.g., save, write, and/or the like) the local key pairs in the key data structure so that keys (e.g., local public keys and local private keys) of the local key pairs are associated with one another (e.g., via a same identifier).

In some implementations, the key generator may pre-generate and/or maintain a same quantity of local key pairs (e.g., 100 key pairs, 200 key pairs, 250 key pairs, and/or the like) for each of the groups, and/or the key exchange controller may store and/or maintain the same quantity of local key pairs in the key data structure for each of the groups. Additionally, or alternatively, the key generator may generate and/or the key exchange controller may store different quantities of local key pairs based on different characteristics of the groups. For example, the key exchange controller may determine that the network device uses more local key pairs for a first group than a second group. In such cases, the key exchange controller may request the key generator to generate more local key pairs for the first group than the second group and, correspondingly, store more local key pairs for the first group than the second group in the key data structure. In this way, the network device may be configured to store a quantity of local key pairs for negotiating security associations based on the frequency and/or quantity of security associations involved with particular types of the keys in the local key pairs.

In this way, the key exchange controller may store the respective sets of local key pairs in the key data structure of the network device to permit a plurality of pre-generated local key pairs to be maintained in the key data structure and/or facilitate negotiation of security associations using the pre-generated local key pairs.

As further shown in FIG. 1A, and by reference number 108, the key data structure maintains the key pairs for each group. As described herein, a local key pair may include a local public key and a local private key. The local public key can be provided to the source device upon receiving a request from the source device to negotiate a security association. The local private key can be used, along with a source public key from the source device, to determine a local secret key for the security association. As described herein, because the local key pairs are pre-generated and maintained in the key data structure, the network device can provide the local public key to the source device while the network device determines the local secret key for the security association.

In this way, the key data structure maintains local key pairs for each group to permit the network device to provide, to the source device associated with one of the groups, a local public key for a security association associated with the source device, as described herein.

As shown in FIG. 1B, and by reference number 110, the key exchange controller receives a request from the source device for a key exchange. For example, the request may be a request to establish a security association between the source device and the network device (e.g., for an encrypted communication session that utilizes the network device and/or is between the source device and another device (such as a peer of the source device)). In some implementations, the request includes a source public key that is to be used in the security association. Accordingly, based on receiving, and/or identifying the source public key, the key exchange controller may determine that the request is associated with negotiating a security association (e.g., to engage in an encrypted communication session with the source device).

In some implementations, the request may be received via a network associated with the network device. For example, the network device may be configured to manage network traffic of the network. More specifically, the network device may be configured to route network traffic via the network, allow network traffic to be communicated via the network, block network traffic from being communicated via the network, configure communication parameters for communication of the network traffic via the network, and/or the like. Accordingly, the source device, which is communicatively coupled to the network, may be seeking to negotiate a security association and/or establish an encrypted communication session via the network device to communicate encrypted network traffic through the network.

In this way, the key exchange controller may receive a request to engage in a key exchange with the source device to permit the network device to perform a key exchange with the source device, as described herein.

As further shown in FIG. 1B, and by reference number 112, the key exchange controller provides a public key from a pre-generated key pair to the source device. As described herein, the key exchange controller may have access to a plurality of sets of local key pairs that are generated prior to receiving the request. Accordingly, the key exchange controller may select a local public key from one of the local key pairs stored in the key data structure and provide the local public key to the source device without having to generate a local key pair (including the local public key) in response to receiving the request.

According to some implementations, to select an appropriate local public key that is to be provided to the source device, the key exchange controller may analyze the source public key received in the request to determine a characteristic of the source public key. For example, the key exchange controller may analyze the source public key to determine a bitlength of the source public key, a security policy associated with the source device, a DH group of the source device, a type of encryption associated with the source public key, and/or the like. In such cases, the key exchange controller may then select, from the key data structure, a local key pair that has or is associated with a corresponding characteristic (e.g., a same bitlength, a same security policy, a same DH group, a same type of encryption, and/or the like). The key exchange controller may use any suitable selection technique (e.g., first-in, first-out (FIFO), last-in, first-out (LIFO), and/or the like) to select a local key pair from the key data structure. The key exchange controller may then extract the local public key from the selected key pair and provide the local public key to the source device to permit the source device to use the local public key for the security association. Accordingly, the source device may receive the local public key and determine a source secret key based on the local public key and a source private key, while the network device determines a local secret key based on the local private key of the selected local key pair and the source public key.

In this way, the key exchange controller may provide a local public key that was pre-generated before receiving a request associated with a security association to permit the key exchange controller to determine a local secret key for the security association while the source device determines a source secret key for the security association. Therefore, by providing the pre-generated local public key to the source device for a security association while determining a local secret key for the security association, the network device may reduce an amount of time to negotiate the security association, as described herein.

As further shown in FIG. 1B, and by reference number 114, the key exchange controller requests a secret key for the security association. For example, the key exchange controller may extract the local private key from the selected local key pair and the source public key from the request. Further, the key exchange controller may provide the local private key and the source public key in a request to the key generator to cause the key generator to determine the local secret key for the security association. As described herein, the local secret key may be used to negotiate the security association and/or may be used during an encrypted communication session with the source device (e.g., to decrypt information encrypted with the source public key).

In this way, based on selecting a pre-generated local key pair for the security association, the network device may cause a local secret key to be determined using the local private key of the pre-generated local key pair.

As further shown in FIG. 1B, and by reference number 116, the key generator determines the secret key for the encrypted communication session. For example, the key generator may perform one or more operations to determine a mapping or conversion of the source public key to the local private key (or vice versa). The key generator may use any suitable technique (e.g., a DH operation) to determine the secret key from the local private key and the source public key. In some implementations, the local secret key is determined based on a characteristic that is shared by both the source public key and the local private key (e.g., a same bitlength, a same security policy, a same DH group, a same type of encryption, and/or the like). Accordingly, the key generator may generate and/or determine a local secret key that has the same characteristic as the source public key and/or local private key (e.g., because the public keys, private keys, and secret keys are to have the same characteristic to negotiate the security association and/or facilitate encrypted communication via the public keys, private keys, and secret keys).

In this way, the key generator may determine a secret key for the security association to permit the network device to engage in an encrypted communication session with the source device.

As further shown in FIG. 1B, and by reference number 118, the key exchange controller receives and uses the secret key for the encrypted communication session. For example, the key exchange controller may complete (at least for the network device) negotiation of the security association with the source device. More specifically, based on receiving the determined local secret key, the key exchange controller may now have access to the source public key, the local private key, and the local secret key to permit encrypted communications with the source device. In some implementations, the key exchange controller may complete negotiation of the security association while the source device correspondingly completes negotiation of the security association (e.g., by determining a source secret key based on the received, pre-generated local public key and a source private key associated with the source public key). Furthermore, the network device (e.g., via the key exchange controller) may establish an encrypted communication session utilizing the security association, as described herein.

In this way, the network device may perform one or more actions associated with the security association to permit the network device to securely communicate with the source device.

As further shown in FIG. 1B, and by reference number 120, the key generator provides a replacement key pair to the key exchange controller. For example, due to one of the pre-generated (e.g., a new local key pair) key pairs being selected and/or utilized for the security association of example implementation 100, the key generator may be configured to generate a new local key pair (e.g., the replacement key pair) to replace the selected local key pair. In some implementations, the key generator may generate the replacement key pair based on determining the local secret key for the security association and/or based on the key exchange controller providing the selected local public key to the source device. In other words, after the key generator determines a local secret key for a security association, as described herein, the key generator may pre-generate another local key pair to replace the selected local key pair for the security association.

According to some implementations, the key generator may generate a replacement key pair that has a same characteristic as the selected local key pair. The key generator may determine the characteristic of the replacement key pair based on the characteristic of the source public key and/or the characteristic the local private key (which may be provided in the request to generate the local secret key). The key generator may provide the replacement key pair to the key exchange controller for storage in the key data structure.

As further shown in FIG. 1B, and by reference number 122, the key exchange controller stores the replacement key pair in the key data structure. As described herein, the replacement key pair may correspond to a new, pre-generated local key pair that can be used to negotiate a subsequent security association. Accordingly, the key exchange controller may store the replacement key pair in the key data structure to replace the selected key pair for the security association. In this way, the network device may maintain a quantity of pre-generated key pairs in the key data structure while negotiating security associations, as each time a local key pair is selected for a security association, as described herein, a new local key pair is to be generated and stored in the key data structure to replace the selected local key pair.

Accordingly, as described herein, the network device may utilize pre-generated key pairs (e.g., local key pairs generated prior to receiving a request to engage in a key exchange) to reduce an amount of time associated with performing a key exchange to negotiate a security association because the network device does not have to generate the local key pairs during the key exchange. Therefore, the network device may conserve computing resources and/or network resources that may otherwise be wasted due to the relatively extended amounts of time required for a network device to negotiate a security association using previous techniques. By reducing the amount of time required to negotiate a security association, the network device may open up resources to perform other operations (e.g., route network traffic, allow or block network traffic, configure parameters for network traffic, and/or the like) and/or engage in additional key exchanges. Therefore, relative to previous techniques, the network device may not only conserve computing resources of the network device, but may also conserve resources (e.g., computing resources and/or network resources) of devices that generate and/or transmit network traffic that would otherwise be dropped by the network device and/or resources of devices requesting key exchanges that could not otherwise be performed by the network device because the network device was pre-occupied with performing other key exchanges using the previous techniques.

As indicated above, FIGS. 1A and 1B are provided merely as one or more examples. Other examples may differ from what is described with regard to FIGS. 1A and 1B.

Figure 2:
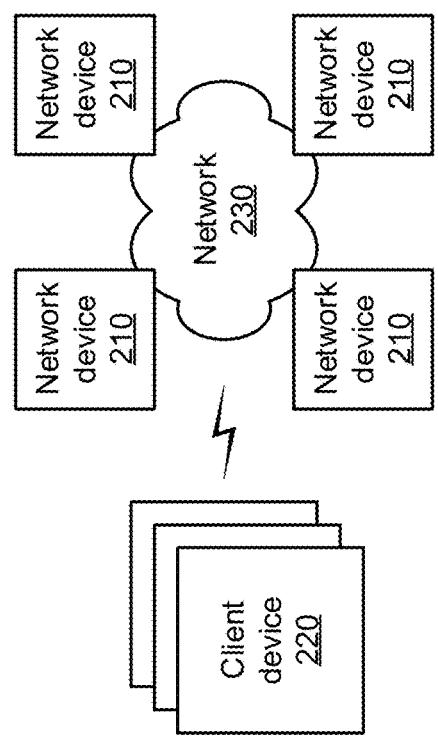
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device 210, one or more client devices 220 (referred to herein individually as client device 220 or collectively as client devices 220), and a network 230. Devices of environment 200 may interconnect via wired connections, wireless connections, or a combination of wired and wireless connections.

Network device 210 includes one or more devices (e.g., one or more traffic transfer devices) capable of processing and/or transferring traffic associated with client devices 220 and/or network 230. For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may be a physical device implemented within a housing, such as a chassis. Additionally, or alternatively, network device 210 may be a virtual device implemented by one or more computer devices of a cloud computing environment or a data center.

Client device 220 includes one or more devices capable of receiving, generating, storing, processing, and/or providing information associated with a key exchange and/or an encrypted communication session, as described herein. For example, client device 220 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
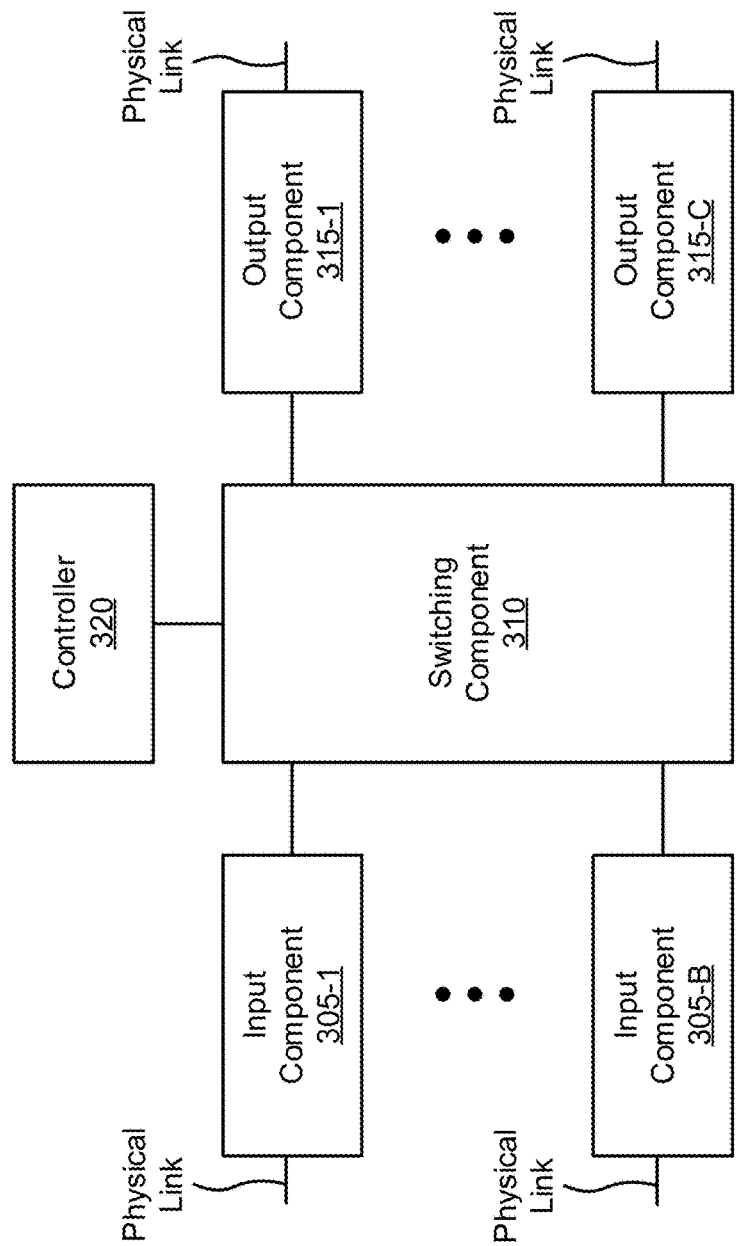
FIG. 3 is a diagram of example components of one or more devices of FIG. 2.

FIG. 3 is a diagram of example components of a device 300. Device 300 may correspond to network device 210 and/or client device 220. In some implementations, network device 210 and/or client device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320. For example, controller 320 may include a key data structure configured to store pre-generated key pairs for one or more processes (e.g., security association negotiations), as described herein.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. For example, controller 320 may perform one or more processes performed by a key exchange controller and/or a key generator, as described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
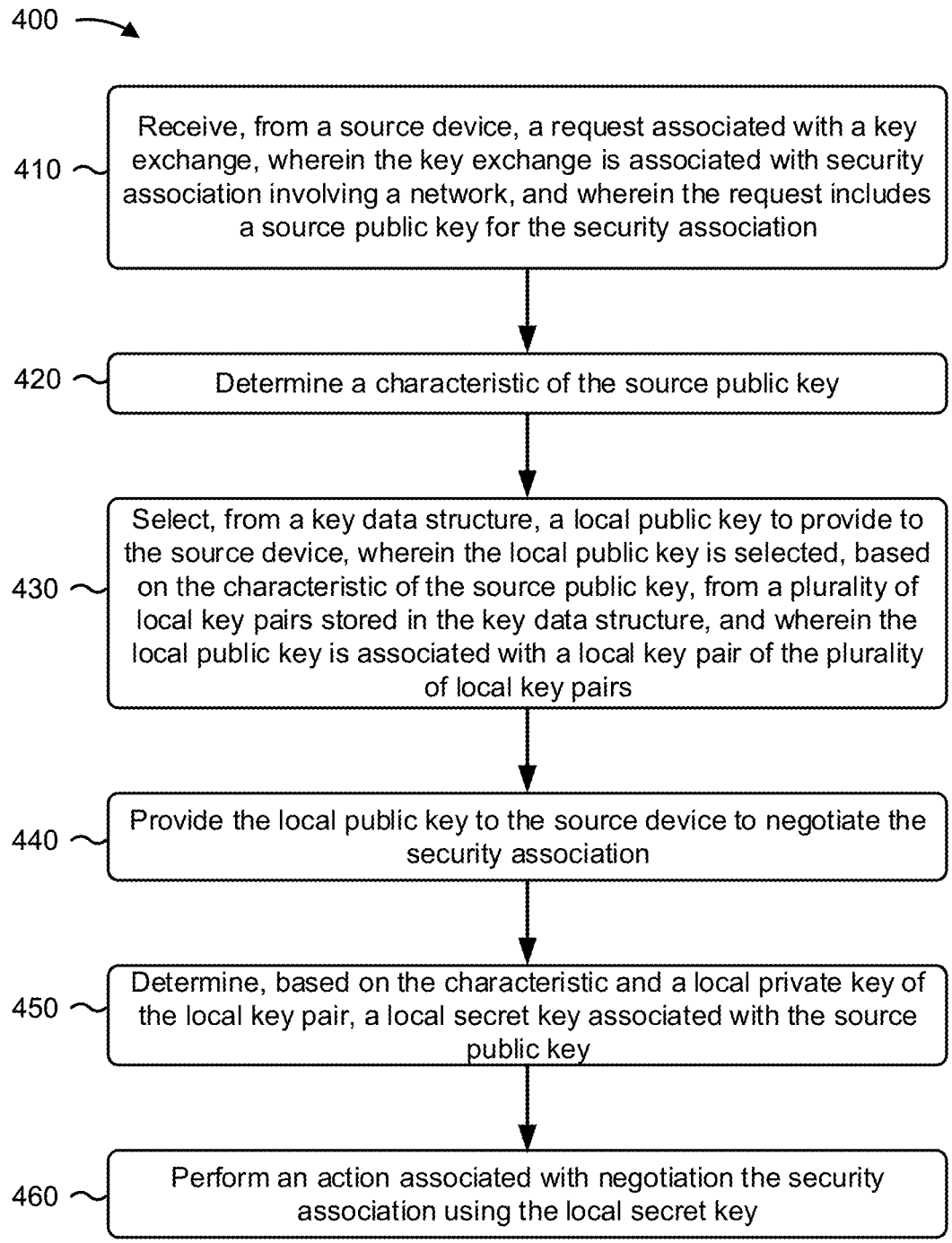
FIGS. 4-6 are flowcharts of an example process for a key exchange using pre-generated key pairs.

FIG. 4 is a flowchart of an example process 400 for a key exchange using pre-generated key pairs. In some implementations, one or more process blocks of FIG. 4 may be performed by a network device (e.g., network device 210). In some implementations, one or more process blocks of FIG. 4 may be performed by another device or a group of devices separate from or including the network device, such as a client device (e.g., client device 220) and/or the like.

As shown in FIG. 4, process 400 may include receiving, from a source device, a request associated with a key exchange, wherein the key exchange is associated with a security association involving a network and wherein the request includes a source public key for the security association (block 410). For example, the network device (e.g., using processor 320, memory 330, storage component 340, input component 350, output component 360, communication interface 370 and/or the like) may receive, from a source device, a request associated with a key exchange, as described above. In some implementations, the key exchange is associated with a security association involving a network. In some implementations, the request includes a source public key for the security association.

As further shown in FIG. 4, process 400 may include determining a characteristic of the source public key (block 420). For example, the network device (e.g., using processor 320, memory 330, storage component 340, input component 350, output component 360, communication interface 370 and/or the like) may determine a characteristic of the source public key, as described above.

As further shown in FIG. 4, process 400 may include selecting, from a key data structure, a local public key to provide to the source device, wherein the local public key is selected, based on the characteristic of the source public key, from a plurality of local key pairs stored in the key data structure, and wherein the local public key is associated with a local key pair of the plurality of local key pairs (block 430). For example, the network device (e.g., using processor 320, memory 330, storage component 340, input component 350, output component 360, communication interface 370 and/or the like) may select, from a key data structure, a local public key to provide to the source device, as described above. In some implementations, the local public key is selected, based on the characteristic of the source public key, from a plurality of local key pairs stored in the key data structure. In some implementations, the local public key is associated with a local key pair of the plurality of local key pairs.

As further shown in FIG. 4, process 400 may include providing the local public key to the source device to negotiate the security association (block 440). For example, the network device (e.g., using processor 320, memory 330, storage component 340, input component 350, output component 360, communication interface 370 and/or the like) may provide the local public key to the source device to negotiate the security association, as described above.

As further shown in FIG. 4, process 400 may include determining, based on the characteristic and a local private key of the local key pair, a local secret key associated with the source public key (block 450). For example, the network device (e.g., using processor 320, memory 330, storage component 340, input component 350, output component 360, communication interface 370 and/or the like) may determine, based on the characteristic and a local private key of the local key pair, a local secret key associated with the source public key, as described above.

As further shown in FIG. 4, process 400 may include performing an action associated with negotiating the security association using the local secret key (block 460). For example, the network device (e.g., using processor 320, memory 330, storage component 340, input component 350, output component 360, communication interface 370 and/or the like) may perform an action associated with negotiating the security association using the local secret key, as described above.

Process 400 may include additional implementations, such as any single implementation or any combination of implementations described below and/or in connection with one or more other processes described elsewhere herein.

In a first implementation, the network device is to generate, based on providing the local public key to the source device, a replacement key pair associated with the characteristic and store the replacement key pair in the key data structure to replace the local key pair associated with the local public key. In a second implementation, alone or in combination with the first implementation, during an encrypted communication session associated with the security association, the local secret key is to be used to decrypt information encrypted with the source public key.

In a third implementation, alone or in combination with one or more of the first and second implementations, the source public key, the local private key, the local public key, and the local secret key are a same bitlength. In a fourth implementation, alone or in combination with one or more of the first through third implementations, at least two sets of local key pairs of the plurality of local key pairs have different characteristics corresponding to the characteristic of the source public key.

In a fifth implementation, alone or in combination with one or more of the first through fourth implementations, the plurality of local key pairs are generated prior to receiving the request based on a set of security policies associated with the network device.

In a sixth implementation, alone or in combination with one or more of the first through fifth implementations, the plurality of local key pairs are pre-generated based on a startup operation associated with the network device.

In a seventh implementation, alone or in combination with one or more of the first through sixth implementations, the source device comprises a client device communicatively coupled to the network, and the network device comprises at least one of: a firewall of the network, a router of the network, or a switch of the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
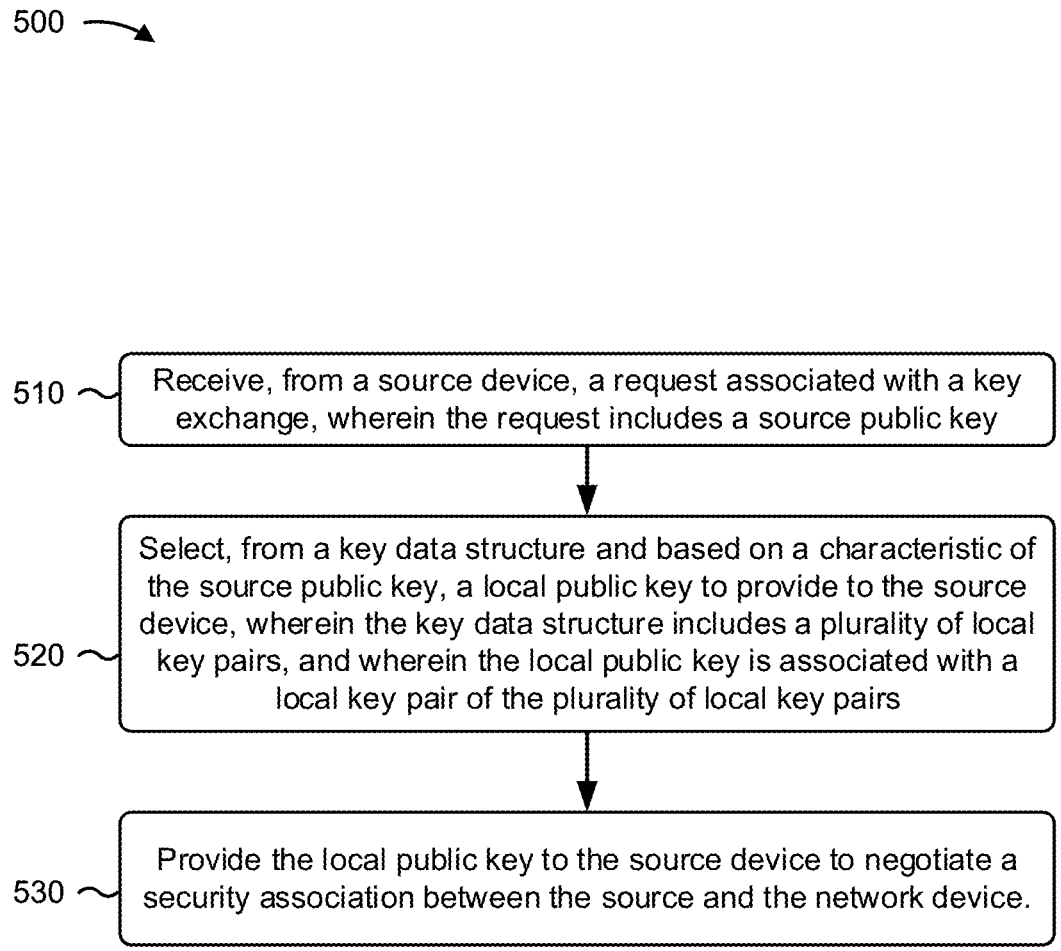

FIG. 5 is a flowchart of an example process 500 for a key exchange using pre-generated key pairs. In some implementations, one or more process blocks of FIG. 5 may be performed by a network device (e.g., network device 210). In some implementations, one or more process blocks of FIG. 5 may be performed by another device or a group of devices separate from or including the network device, such as a client device (e.g., client device 220) and/or the like.

As shown in FIG. 5, process 500 may include receiving, from a source device, a request associated with a key exchange, wherein the request includes a source public key (block 510). For example, the network device (e.g., using processor 320, memory 330, storage component 340, input component 350, output component 360, communication interface 370 and/or the like) may receive, from a source device, a request associated with a key exchange, as described above. In some implementations, the request includes a source public key.

As further shown in FIG. 5, process 500 may include selecting, from a key data structure and based on a characteristic of the source public key, a local public key to provide to the source device, wherein the key data structure includes a plurality of local key pairs, and wherein the local public key is associated with a local key pair of the plurality of local key pairs (block 520). For example, the network device (e.g., using processor 320, memory 330, storage component 340, input component 350, output component 360, communication interface 370 and/or the like) may select, from a key data structure and based on a characteristic of the source public key, a local public key to provide to the source device wherein the key data structure includes a plurality of local key pairs, as described above. In some implementations, the key data structure includes a plurality of local key pairs. In some implementations, the local public key is associated with a key pair of the plurality of local key pairs.

As further shown in FIG. 5, process 500 may include providing the local public key to the source device to negotiate a security association between the source device and the network device (block 530). For example, the network device (e.g., using processor 320, memory 330, storage component 340, input component 350, output component 360, communication interface 370 and/or the like) may provide the local public key to the source device to negotiate a security association between the source device and the network device, as described above.

Process 500 may include additional implementations, such as any single implementation or any combination of implementations described below and/or in connection with one or more other processes described elsewhere herein.

In a first implementation, the network device is to generate, based on providing the local public key to the source device, a replacement key pair associated with the characteristic, and store the replacement key pair in the key data structure to replace the key pair associated with the local public key.

In a second implementation, alone or in combination with the first implementation, the characteristic corresponds to at least one of: a bitlength of the source public key and the local public key, or a security policy associated with the source device. In a third implementation, alone or in combination with one or more of the first and second implementations, at least two sets of key pairs of the plurality of key pairs have different characteristics corresponding to the characteristic of the source public key.

In a fourth implementation, alone or in combination with one or more of the first through third implementations, the plurality of key pairs are generated prior to receiving the request. In a fifth implementation, alone or in combination with one or more of the first through fourth implementations, the network device is a first network device of a network. In some implementations, the source device is a second network device of the network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
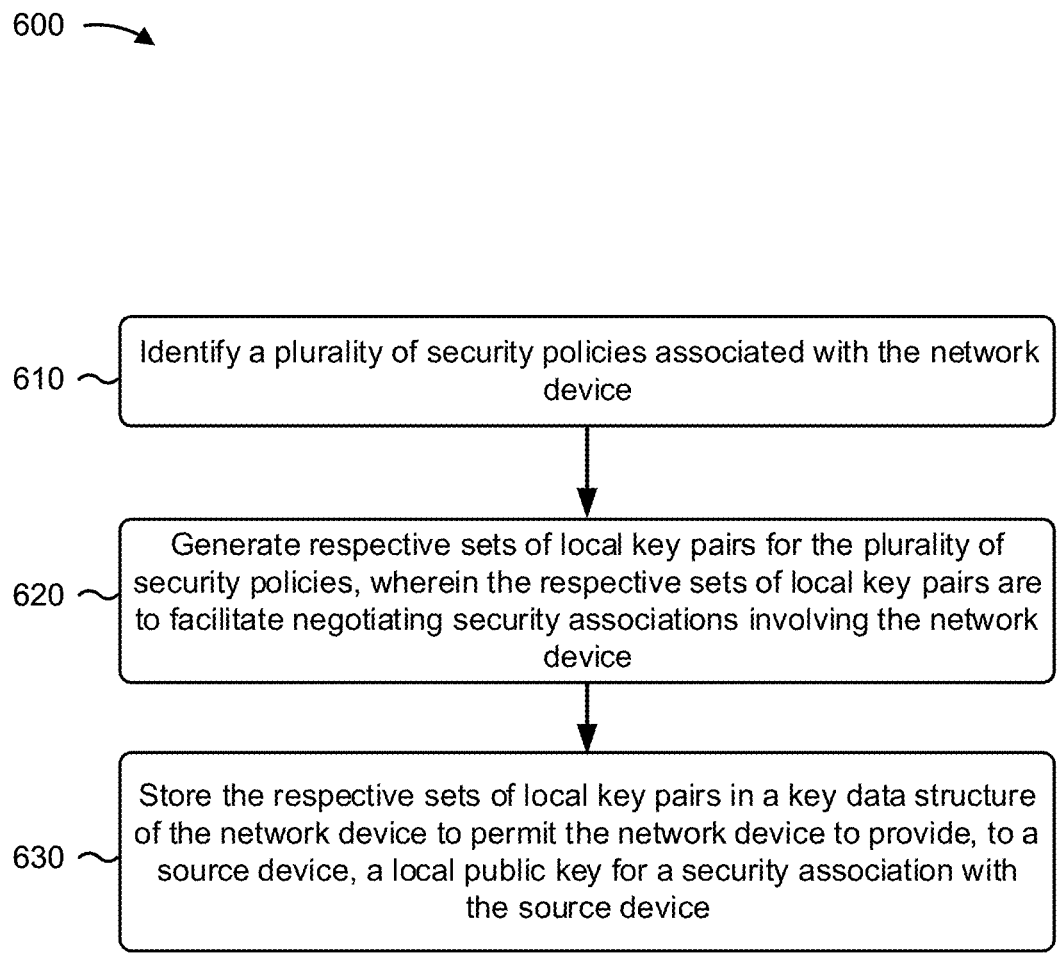

FIG. 6 is a flowchart of an example process 600 for a key exchange using pre-generated key pairs. In some implementations, one or more process blocks of FIG. 6 may be performed by a network device (e.g., network device 210). In some implementations, one or more process blocks of FIG. 6 may be performed by another device or a group of devices separate from or including the network device, such as a client device (e.g., client device 220) and/or the like.

As shown in FIG. 6, process 600 may include identifying a plurality of security policies associated with the network device (block 610). For example, the network device (e.g., using processor 320, memory 330, storage component 340, input component 350, output component 360, communication interface 370 and/or the like) may identify a plurality of security policies associated with the network device, as described above.

As further shown in FIG. 6, process 600 may include generating respective sets of local key pairs for the plurality of security policies, wherein the respective sets of local key pairs are to facilitate negotiating security associations involving the network device (block 620). For example, the network device (e.g., using processor 320, memory 330, storage component 340, input component 350, output component 360, communication interface 370 and/or the like) may generate respective sets of local key pairs for the plurality of security policies, as described above. In some implementations, the respective sets of local key pairs are to facilitate negotiating security associations involving the network device.

As further shown in FIG. 6, process 600 may include storing the respective sets of local key pairs in a key data structure of the network device to permit the network device to provide, to a source device, a local public key for a security association with the source device (block 630). For example, the network device (e.g., using processor 320, memory 330, storage component 340, input component 350, output component 360, communication interface 370 and/or the like) may store the respective sets of local key pairs in a key data structure of the network device to permit the network device to provide, to a source device, a local public key for a security association with the source device, as described above.

Process 600 may include additional implementations, such as any single implementation or any combination of implementations described below and/or in connection with one or more other processes described elsewhere herein.

In a first implementation, the respective sets of local key pairs are generated based on a startup operation of the network device. In a second implementation, alone or in combination with the first implementation, key pairs of at least two of the respective sets of local key pairs have different bitlengths.

In a third implementation, alone or in combination with one or more of the first and second implementations, the plurality of security policies correspond to bitlengths of key pairs in the respective sets of local key pairs. In a fourth implementation, alone or in combination with one or more of the first through third implementations, the source device comprises a client device that is communicatively coupled with a network that is associated with the network device.

In a fifth implementation, alone or in combination with one or more of the first through fourth implementations, the local public key for the security association is capable of being provided to the source device while the network device determines a local secret key for the security association with the source device, wherein the local secret key is determined based on a source public key associated with the source device and a local private key associated with the local public key.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a network device and from a source device, a request associated with a key exchange, wherein the key exchange is associated with a security association involving a network, and
wherein the request includes a source public key for the security association;
determining, by the network device, a characteristic of the source public key;
selecting, by the network device and from a key data structure, a local public key to provide to the source device,
wherein the local public key is selected, based on the characteristic of the source public key, from a plurality of local key pairs stored in the key data structure, wherein the characteristic is a bitlength of the source public key,
wherein the local public key is associated with a local key pair, of the plurality of local key pairs,
wherein a bitlength of the local key pair corresponds to the bitlength of the source public key to facilitate negotiating the security association, and
wherein the plurality of local key pairs are generated prior to receiving the request based on a set of security policies associated with the network device,
wherein a first security policy, of the set of security policies, is associated with a first set of local key pairs of the plurality of local key pairs, and
wherein a second security policy, of the set of security policies, is associated with a second set of local key pairs of the plurality of local key pairs,
wherein the first set of local key pairs and the second set of local key pairs have different bitlengths;
providing, by the network device, the local public key to the source device to negotiate the security association;
determining, based on the characteristic and a local private key of the local key pair, a local secret key associated with the source public key; and
performing, by the network device, an action associated with negotiating the security association using the local secret key.

2. The method of claim 1, further comprising:
generating, based on providing the local public key to the source device, a replacement key pair associated with the characteristic; and
storing the replacement key pair in the key data structure to replace the local key pair associated with the local public key.

3. The method of claim 1, wherein, during an encrypted communication session associated with the security association, the local secret key is to be used to decrypt information encrypted with the source public key.

4. The method of claim 1, wherein the source public key, the local private key, the local public key, and the local secret key are a same bitlength.

5. The method of claim 1, wherein the first set of local key pairs and the second set of local key pairs have different characteristics corresponding to the characteristic of the source public key.

6. The method of claim 1, wherein the plurality of local key pairs are generated prior to receiving the request based on a startup operation associated with the network device.

7. The method of claim 1, wherein the source device comprises a client device communicatively coupled to the network, and
wherein the network device comprises at least one of:
a firewall of the network,
a router of the network, or
a switch of the network.

8. A network device, comprising:
one or more memories; and
one or more processors communicatively coupled to the one or more memories, to:
receive, from a source device, a request associated with a key exchange, wherein the request includes a source public key;
select, from a key data structure and based on a characteristic of the source public key, a local public key to provide to the source device,
wherein the local public key is selected, based on the characteristic of the source public key, from a plurality of local key pairs stored in the key data structure,
wherein the characteristic is a bitlength of the source public key,
wherein the local public key is associated with a local key pair of the plurality of local key pairs,
wherein a bitlength of the local key pair corresponds to the bitlength of the source public key to facilitate negotiating a security association, and
wherein the plurality of local key pairs are generated prior to receiving the request based on a set of security policies associated with the network device,
wherein a first security policy, of the set of security policies, is associated with a first set of local key pairs of the plurality of local key pairs,
wherein a second security policy, of the set of security policies, is associated with a second set of local key pairs of the plurality of local key pairs, and
wherein the first set of local key pairs and the second set of local key pairs have different bitlengths;
provide the local public key to the source device to negotiate the security association between the source device and the network device;
determine, based on the characteristic and a local private key of the local key pair, a local secret key associated with the source public key; and
perform, by the network device, an action associated with negotiating the security association using the local secret key.

9. The network device of claim 8, wherein the one or more processors are further to:
generate, based on providing the local public key to the source device, a replacement key pair associated with the characteristic; and
store the replacement key pair in the key data structure to replace the local key pair associated with the local public key.

10. The network device of claim 8, wherein the characteristic corresponds to:
the first security policy, the second security policy, or another security policy, from the set of security policies, associated with the source device.

11. The network device of claim 8, wherein the first set of local key pairs and the second set of local key pairs have different characteristics corresponding to the characteristic of the source public key.

12. The network device of claim 8, wherein the network device is a first network device of a network, and
wherein the source device is a second network device of the network.

13. The method of claim 1, wherein the network device is a first network device of the network, and
wherein the source device is a second network device of the network.

14. The network device of claim 8, wherein, during an encrypted communication session associated with the security association, the local secret key is to be used to decrypt information encrypted with the source public key.

15. A non-transitory computer-readable medium storing instructions, the instructions comprising:
one or more instructions that, when executed by one or more processors of a network device, cause the one or more processors to:
receive, from a source device, a request associated with a key exchange,
wherein the key exchange is associated with a security association involving a network, and
wherein the request includes a source public key for the security association;
determine a characteristic of the source public key;
select, from a key data structure, a local public key to provide to the source device,
wherein the local public key is selected, based on the characteristic of the source public key, from a plurality of local key pairs stored in the key data structure,
wherein the characteristic is a bitlength of the source public key,
wherein the local public key is associated with a local key pair, of the plurality of local key pairs,
wherein a bitlength of the local key pair corresponds to the bitlength of the source public key to facilitate negotiating the security association, and
wherein the plurality of local key pairs are generated prior to receiving the request based on a set of security policies associated with the network device,
wherein a first security policy, of the set of security policies, is associated with a first set of local key pairs of the plurality of local key pairs, and
wherein a second security policy, of the set of security policies, is associated with a second set of local key pairs of the plurality of local key pairs,
wherein the first set of local key pairs and the second set of local key pairs have different bitlengths;
provide the local public key to the source device to negotiate the security association;
determine, based on the characteristic and a local private key of the local key pair, a local secret key associated with the source public key; and
perform an action associated with negotiating the security association using the local secret key.

16. The non-transitory computer-readable medium of claim 15, wherein the one or more instructions, when executed by one or more processors, further cause the one or more processors to:
generate, based on providing the local public key to the source device, a replacement key pair associated with the characteristic; and
store the replacement key pair in the key data structure to replace the local key pair associated with the local public key.

17. The non-transitory computer-readable medium of claim 15, wherein, during an encrypted communication session associated with the security association, the local secret key is to be used to decrypt information encrypted with the source public key.

18. The non-transitory computer-readable medium of claim 15, wherein the source device comprises a client device communicatively coupled to the network, and
wherein the network device comprises at least one of:
a firewall of the network,
a router of the network, or
a switch of the network.

19. The non-transitory computer-readable medium of claim 15, wherein the first set of local key pairs and the second set of local key pairs have different characteristics corresponding to the characteristic of the source public key.

20. The non-transitory computer-readable medium of claim 15, wherein the plurality of local key pairs are generated prior to receiving the request based on a startup operation associated with the network device.

* * * * *